April 2, 1957      M. F. FAWCETT      2,787,448
ROTARY IMPELLER
Filed Oct. 20, 1954
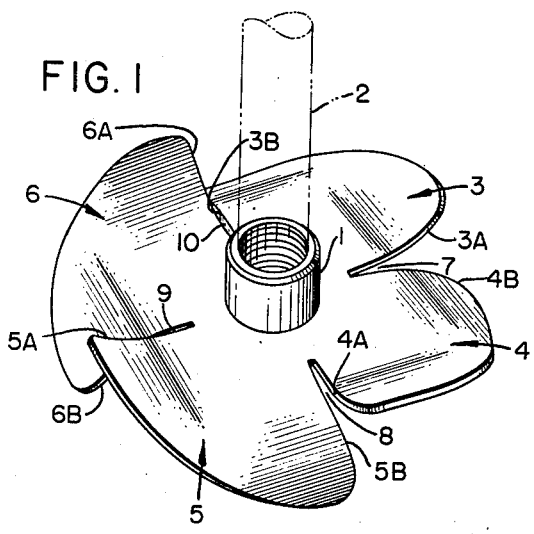
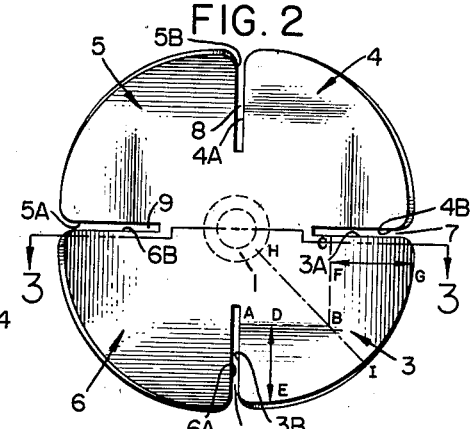
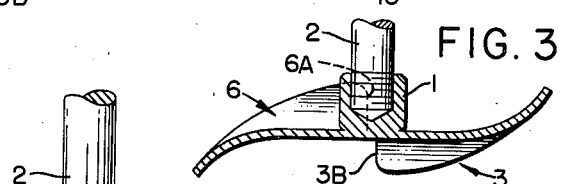
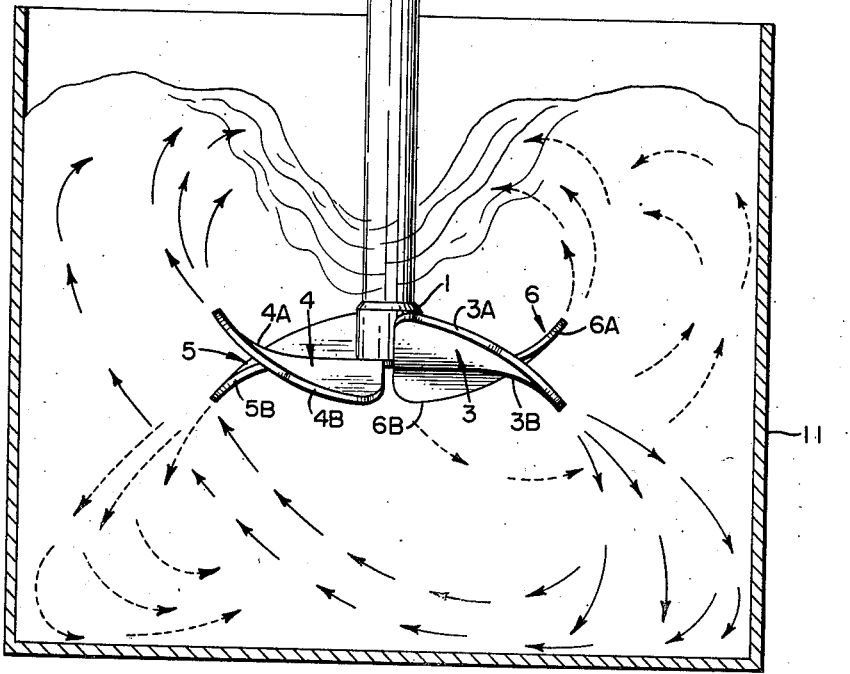
*INVENTOR.*
MILLARD F. FAWCETT
BY
ATTORNEY.

United States Patent Office 2,787,448
Patented Apr. 2, 1957

2,787,448
ROTARY IMPELLER
Millard F. Fawcett, Macedonia, Ohio

Application October 20, 1954, Serial No. 463,547

3 Claims. (Cl. 259—134)

This invention relates in general to rotary impellers and more particularly to improvements in impellers primarily for use as agitators for stirring liquids containing solids so as to hold such solids evenly and uniformly distributed in suspension in the liquid.

Among other applications for my invention, I have in mind as an object of my invention the solution of the proper construction of a rotary blade impeller for use as an agitator for stirring paints, shellacs, enamels and the like. Using the broad term of paint for purposes of discussion, it is well known that heavy solids, forming a necessary component of the paint, soon settle at the bottom of the paint container when the latter is at rest and that a considerable amount of stirring is entailed in order to evenly distribute and suspend the paint solids in the liquid in order to provide the proper mixture for application of the paint for its intended purposes.

Many futile approaches have been made in an attempt to solve the problem at hand. One approach has been to employ propellers of a construction that would be efficient as a traction or pusher type of air screw but which is entirely inadequate for the purposes at hand because it results in the entire body of liquid, including the solids, rotating in a circular direction at approximately the same speed of rotation as the propeller, to develop what is known in the art as a swirl with an excessive vortex and leaving a considerable amount of solids in the bottom of the container unagitated and unaffected by the action of the propeller. The result is incomplete and inadequate paint mixing.

This fact has become so well recognized that other approaches have been made, including single paddle wheels and multiple paddle wheels disposed in different planes, both alone and in combination with inside baffles in the container in an attempt to break up the swirl and diminish the excess vortex of flow.

One of the primary objects of my invention is to provide an improved impeller that, while being inefficient as a traction air screw, will be effective in creating turbulence of the liquid and solid mixture throughout, including the solids of the mixture lying on the bottom of the container, so as to effectively reduce the speed of rotational swirl of the mixture to below that of the impeller, reduce the vortex and induce a combined radial and downward flow so as to increase turbulence by cross flows and dislodge all solids within the mixture and effectively hold them in suspension and in even distribution in the liquid.

With the foregoing and other objects in view, the invention resides in the combination of parts and in the details of construction hereinafter set forth in the following specification and appended claims, certain embodiments thereof being illustrated in the accompanying drawings, in which:

Figure 1 is a view in perspective of my improved multi-bladed impeller;

Figure 3 is a view in section taken along line 3—3 of Figure 2 is a bottom plan view of the same;

Figure 2; and

Figure 4 is a view in elevation of the impeller and driving shaft, showing the impeller submerged in a liquid mixture in a container and showing the various paths of liquid mixture flow induced by rotation of the impeller.

Referring more particularly to the drawings, my improved impeller is shown as comprising an internally screw-threaded hub 1 to receive an externally screw-threaded shaft 2 adapted to be preferably rotatably driven by an electric power source. The impeller, itself, is shown to preferably include four blades 3, 4, 5 and 6. These blades may be formed out of a circular disc by punching separating slots 7, 8, 9 and 10 in the disc and subsequently bending the blades to assume their proper forms for efficient operation.

For purposes of illustration, the impeller is shown in Figures 1 to 4, inclusive, as being adapted to be rotated in a clockwise direction so that blades 3, 4, 5 and 6 have leading edges 3A, 4A, 5A and 6A and trailing edges 3B, 4B, 5B and 6B.

The four blades are formed to be identical in configuration. Referring to blade 3, I leave the portion radially inwardly of dotted lines A—B and B—C flat, while radially outwardly of line B—C I bend the area included in line F—G of the leading edge 3A upwardly along line B—C to approximately a 50 degree angle and I bend the area included in line D—E of the trailing edge 3B correspondingly downwardly along line A—B to approximately a 50 degree angle. The lines A—B and B—C represent a distance equal to one-half the radial length of the blade in right angle planes to each other. This leaves a considerable portion of the central area of the blades surrounding the hub to be flat. This leaves the leading edge 3A flared upwardly and radially outwardly and tapered rearwardly to the midway line H—I and the trailing edge 3B correspondingly flared downwardly and tapered forwardly to the midway line H—I.

Referring to Figure 4, I have shown a container 11 adapted to contain a liquid mixture, such as paint, which contains solids, as well as liquid. As stated before, the problem I propose to solve is the provision of a rotary impeller so constructed as to be able to deflect the liquid both radially outwardly and downwardly so as to reach all areas of the container to disengage the solids and mingle them in the liquid flow resulting from rotation of the impeller. I also propose to create several conflicting paths of flow of the liquid mixture whereby I may considerably reduce the vortex of flow and appreciably reduce flow swirl by reducing the speed of the circular flow of the liquid mixture to less than the speed of rotation of the impeller.

The arrows in Figure 4 illustrate the flow deflected by the bent-up leading edges of the blades to be radially outwardly and angularly upwardly and the flow deflected by the bent-down trailing edges to be radially outwardly and angularly outwardly. The flow deflected by the leading edges impinges on the inside sides of the container and enters the vortex where such flow is intermingled with flow deflected by the trailing edges both outwardly and downwardly to reach the bottom and bottom edges of the container and across to the opposite sides before flowing upwardly into the vortex.

Thus, it will be seen that I have provided a single, simple, efficient and inexpensive impeller, preferably driven by an electric motor driven drill, for quickly and effectively bringing about an even distribution of solids of the mixture into suspension in the liquid of the mixture. By my impeller blade construction, I greatly reduce, to virtually the point of avoidance of, the swirl, or uninterrupted circular rotation of the body of the mixture. Thus, I reduce the flow vortex and I avoid the uninterrupted continued rotary travel of the solids in their same positions. Moreover, I avoid the necessity of employing offset multiple agitators, paddle wheels, coils, baffles, and the like, or vessels with rounded inside bottom surfaces. I am able to increase and generalize the turbulence with the proper direction of flow throughout the entire lower portion of the vessel where the solids settle, and at the same time, reduce flow swirl by the interchange of material from turbulence to swirl so as to greatly reduce the time necessary for proper mixing. In other words, my impeller not only provides for increased turbulence throughout the entire lower portion of the mixture in the vessel, but also retards swirl by reason of the direction of the radial and axial flow. Turbulence is created by multiple helical streams traveling in radial and axial directions which forces heavy solids into suspension quickly so as to obtain even distribution. At any given speed of rotation of my impeller, the rotational speed of swirl is much less than the rotational speed of the impeller so as to reduce the vortex and swirl and faster mixing.

My impeller blades depend for their action not upon the pitch angle of the blades, but upon the bending up of the leading edges and the bending down of the trailing edges of the blade. This results in imparting to the fluid particles velocities not only downward, but sideward. This is not the case with conventional air screw propellers where the swirl velocity is appreciable since the pitch angle of the blades, extending throughout the entire blade area, creates an appreciable undesirable swirl.

I claim:

1. An impeller for agitating liquid mixtures containing liquid and solid particles, said impeller having a hub and a rotary shaft connected to said hub to rotate said impeller, said impeller comprising a plurality of blades extending generally radially outwardly from said hub, the radially inner substantially one-half of the radial length of each blade being substantially flat in a plane at right angles to said shaft, each blade having a leading edge and a trailing edge with respect to the predetermined direction of rotation of the shaft and blade, the radially outer portion of the leading edge being bent upwardly from a plane coincident with the median radial center line of the blade and in a radial plane to form a radially extending radius and the radially outer portion of the trailing edge being correspondingly bent downwardly to form a radially extending radius, said impeller, when submerged in said liquid mixture confined within a container, being adapted to have the bent-up portion of its leading edge deflect flow axially upwardly and radially outwardly and the bent-down portion of its trailing edge deflect flow axially downwardly and radially outwardly to maintain the flow of vortex at a minimum and to maintain the swirl at a minimum by interrupting the rotational speed of travel of the mixture to maintain such speed below that of the rotation of the impeller.

2. An impeller for agitating liquid mixtures containing liquid and solid particles, said impeller having a hub and a rotary shaft connected to said hub to rotate said impeller, said impeller comprising a plurality of blades extending generally radially outwardly from said hub, the radially inner substantially one-half of the radial length of each blade being substantially flat in a plane at right angles to said shaft, each blade having a leading edge and a trailing edge with respect to the predetermined direction of rotation of the shaft and blade, the radially outer portion of the leading edge being bent upwardly from a plane coincident with the median radial center line of the blade to an angle of approximately fifty degrees and in a radial plane to form a radially extending radius and the radially outer portion of the trailing edge being correspondingly bent downwardly to form a radially extending radius, said impeller, when submerged in said liquid mixture confined within a container, being adapted to have the bent-up portion of its leading edge deflect flow axially upwardly and radially outwardly and the bent-down portion of its trailing edge deflect flow axially downwardly and radially outwardly to maintain the flow vortex at a minimum and to maintain the swirl at a minimum by interrupting the rotational speed of travel of the mixture to maintain such speed below that of the rotation of the impeller.

3. An impeller for agitating liquid mixtures containing liquid and solid particles, said impeller having a hub and a rotary shaft connected to said hub to rotate said impeller, said impeller comprising a plurality of blades extending generally radially outwardly from said hub, each blade having a leading edge and a trailing edge with respect to the predetermined direction of rotation of the shaft and blade, the radially outer portion of the leading edge being bent upwardly from a plane coincident with the median radial center line of the blade and in a radial plane to form a radially extending radius and the radially outer portion of the trailing edge being correspondingly bent downwardly to form a radially extending radius, said impeller, when submerged in said liquid mixture confined within a container, being adapted to have the bent-up portion of its leading edge deflect flow axially upwardly and radially outwardly and the bent-down portion of its trailing edge deflect flow axially downwardly and radially outwardly to maintain the flow vortex at a minimum and to maintain the swirl at a minimum by interrupting the rotational speed of travel of the mixture to maintain such speed below that of the rotation of the impeller.

References Cited in the file of this patent

UNITED STATES PATENTS

| | | |
|---|---|---|
| 489,336 | Siewers | Jan. 3, 1893 |
| 579,668 | Wilson | Mar. 30, 1897 |
| 1,658,460 | Nichols | Feb. 7, 1928 |
| 2,193,686 | Craddock | Mar. 12, 1940 |
| 2,576,802 | Morris | Nov. 27, 1951 |